Figure 1:
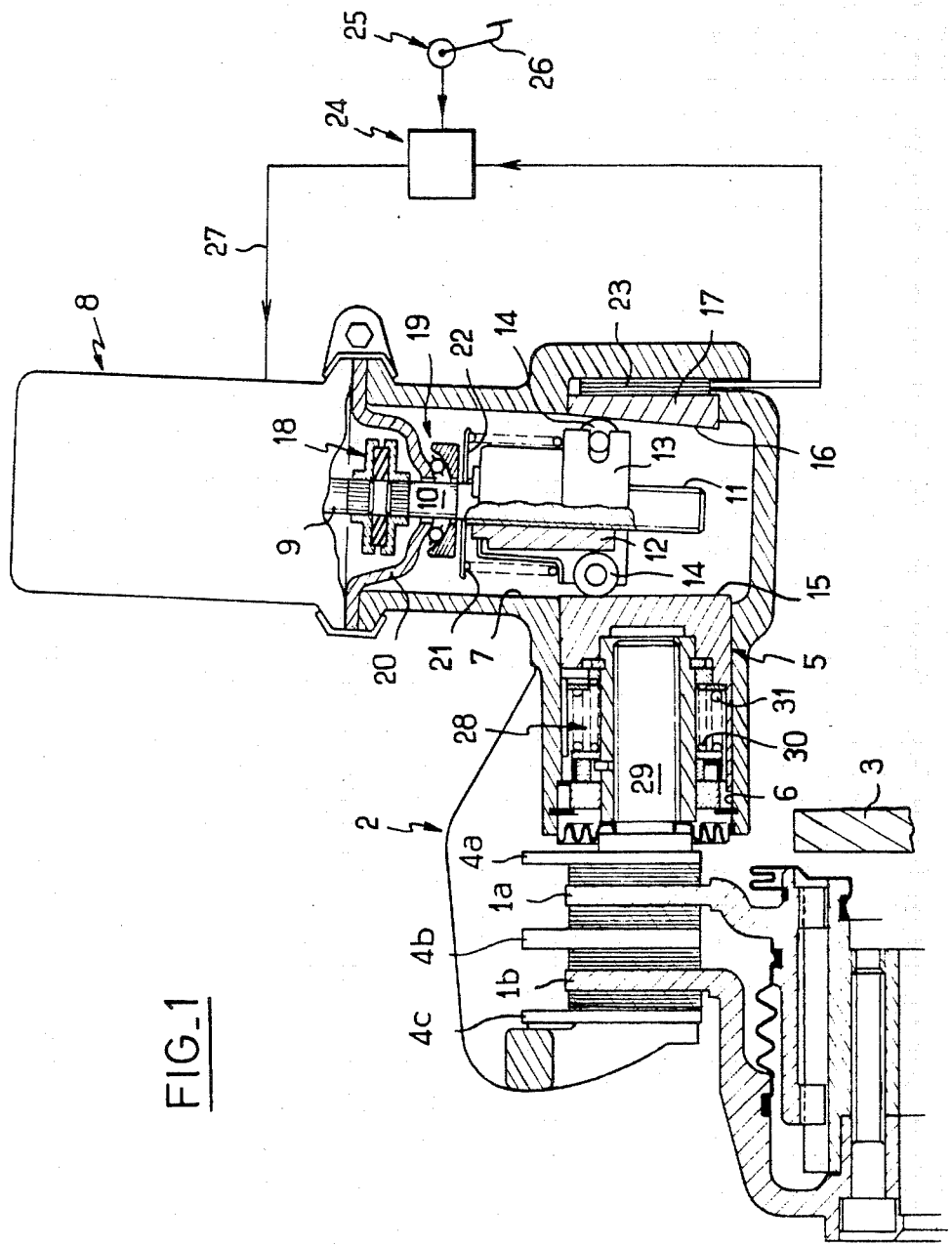

United States Patent [19]

Carre et al.

[11] Patent Number: 4,784,244
[45] Date of Patent: Nov. 15, 1988

[54] ELECTRICAL BRAKING DEVICE FOR VEHICLES

[75] Inventors: Jean-Jacques Carre, Le Raincy; Alain Thioux, Chennevieres, both of France

[73] Assignee: Bendix France, Drancy, France

[21] Appl. No.: 932,750

[22] Filed: Nov. 18, 1986

[30] Foreign Application Priority Data

Nov. 20, 1985 [FR] France ................................ 85 17180

[51] Int. Cl.$^4$ .............................................. B60T 13/74
[52] U.S. Cl. .................................. 188/156; 188/72.7; 188/162; 188/343
[58] Field of Search .................... 188/72.7, 72.3, 156, 188/158, 162, 343

[56] References Cited

U.S. PATENT DOCUMENTS

| | | | |
|---|---|---|---|
| 3,809,191 | 5/1974 | Woodward | 188/162 X |
| 3,966,028 | 6/1976 | Anderson et al. | 188/196 BA |
| 3,994,371 | 11/1976 | Farr | 188/343 |
| 4,064,973 | 12/1977 | Deem et al. | 188/71.7 |
| 4,194,596 | 3/1980 | Garrett et al. | 188/72.7 |
| 4,381,049 | 4/1983 | Crossman | 188/72.7 |
| 4,546,298 | 10/1985 | Wickham et al. | 188/162 X |
| 4,621,713 | 11/1986 | Carre et al. | 188/343 X |
| 4,658,939 | 4/1987 | Kircher et al. | 188/152 |

FOREIGN PATENT DOCUMENTS

| | | |
|---|---|---|
| 0013502 | 7/1980 | European Pat. Off. |
| 0023468 | 2/1981 | European Pat. Off. |
| 0109918 | 5/1984 | European Pat. Off. |
| 0117192 | 8/1984 | European Pat. Off. |
| 1589010 | 4/1970 | France . |
| 2557241 | 6/1985 | France . |
| 2557528 | 7/1985 | France . |
| 2053394 | 2/1981 | United Kingdom . |
| 2156021 | 10/1985 | United Kingdom . |

Primary Examiner—Douglas C. Butler
Assistant Examiner—Matthew C. Graham
Attorney, Agent, or Firm—Larry J. Palguta; Ken C. Decker

[57] ABSTRACT

The friction member (4a) is actuated, via a piston mechanism (5), by an assembly consisting of a wedge (12) and of rollers (14), put into operation as a result of the rotation of a control shaft (11) driven by an electric motor (8) under the supervision of a force or pressure sensor (23) associated with one of the surfaces of ramps (16) interacting with the rollers (14).

8 Claims, 2 Drawing Sheets

FIG_1

ELECTRICAL BRAKING DEVICE FOR VEHICLES

The present invention relates to electrical braking devices for vehicles, of the type comprising an actuating mechanism for displacing at least one friction member in one direction and for bringing it into frictional engagement with at least one rotary member to be braked, the actuating mechanism comprising an electric motor which drives in rotation a control shaft having a threaded part cooperating in reversible driving engagement with an actuating member displaceable linearly to actuate the friction member.

An electrical braking device of this type is described in the document No. FR-A-2,557,528. In the device of this document, the actuating member, actuated by the control shaft, is in the form of a screw engaging a pressure lever articulated on a supporting piece and coupled to the friction member, in an arrangement which is difficult to construct and put into effect and necessitates a special structure for the braking device as a whole, and which has a relatively low efficiency requiring considerable electrical power.

It is therefore an object of the present invention to provide a braking device for vehicles of the type in question, which has a simple and robust design and low production costs, necessitates only slight general modifications in the braking assembly as a whole, has an improved efficiency, consequently requiring a reduced electrical power, and is suitable for a large number of different uses in a wide range of vehicles.

To achieve this, according to a feature of the invention, the threaded shaft extends substantially at a right angle to the direction of displacement of the friction member, the actuating member comprising a wedge structure associated with at least one pair of rollers cooperating respectively with a pair of opposing ramp surfaces, of which at least a first ramp surface is formed on a piston means displaceable in the direction to actuate the friction member.

The arrangement according to the invention makes it possible, on the one hand, to dispose the actuating mechanism easily in a general brake structure of conventional design and, on the other hand, to obtain, in a reduced overall volume, an improved efficiency allowing it to be used in a wide range of vehicles.

With this in view, according to another feature of the invention, the rotary member to be braked consists of at least one disc, advantageously two discs, the braking device having a calliper structure straddling the disc and supporting the actuating mechanism, the piston means sliding in a bore formed in the calliper structure which can thus be derived directly from a calliper structure of a conventional braking device operating hydraulically or hydromechanically.

Figure 2:
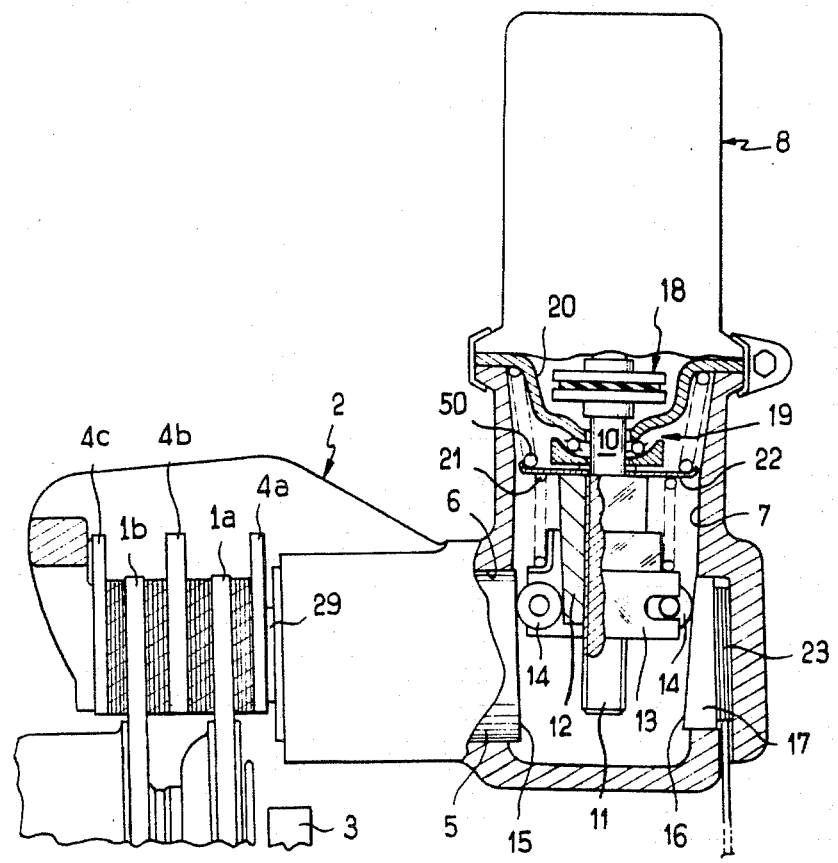

The present invention will now be described by way of example with reference to the accompanying drawings in which:

FIG. 1 is a diagrammatic sectional view of an electrical braking device according to the invention; and FIG. 2 is a similar view of another embodiment of the invention.

In the embodiment illustrated in FIG. 1, there is shown a disc brake assembly, of the general type described in the document No. EP-A-0,117,192, the content of which is assumed to be incorporated here for reference, and comprising a pair of parallel discs 1a, 1b coupled to a vehicle wheel (not shown) and straddled by a calliper structure designated as a whole by the reference numeral 2 and mounted slideably on a fixed support designated by the reference numeral 3. Mounted guideably and slideably in the calliper structure 2 are friction members 4A, 4B, 4C displaceable in a direction parallel to the axis of rotation of the discs 1a and 1b directly, and indirectly as a result of a reaction via the stirrup structure 2, by a piston means designated as a whole by the reference numeral 5 and sliding in a bore 6 formed in the calliper structure and having an axis parallel to the axis of rotation of the discs 1a, 1b. The bore 6 opens into a well 7 which is formed transversely in the calliper structure 2 and on the outer end of which an electric motor 8 is mounted. The output shaft 9 of the electric motor 8 is coupled in for rotation to a control shaft 10 extending in the well 7 in a direction substantially at right angle to the axis of the bore 6 (in actual fact, at an angle of approximately 85° relative to this axis). The control shaft has a threaded main end part 11, on which is engaged, by reversible engagement, an internally tapped wedge structure 12, with which is associated a cage 13 carrying at least one pair of rollers having parallel axes 14 cooperating respectively in bearing and rolling engagement with a pair of opposing ramp surfaces 15 and 16 converging in the direction of convergence of the outer wedge surfaces of the wedge structure 12. A first (15) of these ramp surfaces is formed by the inner face of the piston structure 5 projecting into the well 7, the second (16) of these ramp surfaces being formed by a block 17 mounted in the zone of the well 7 opposite the bore 6.

To allow a slight angular movement of the control shaft 10 relative to the output shaft 9 of the electric motor 8, in accompanying the displacement of the piston means 5, the non-threaded end of the control shaft 10 is coupled to the output shaft 9 by means of an elastic coupling 18 of the type with an elastic ring secured to two metal flanges coupled to the shafts 9 and 10 respectively. Mounted on the non-threaded portion of the control shaft 10 is a spherical cage of a ball thrust-bearing, designated as a whole by the reference numeral 19, of which the stationary cage, likewise having a spherical central portion, consists of a partition 20, through which the control shaft 10 passes and which is clamped between the mounting flange of the electric motor 8 and an end flange of the portion of the calliper structure 2 defining the well 7. A compression spring 21, gearing on a collar 22 supported on the control shaft 10, biases the cage 13 carrying the rollers 14 in the direction tending to keep the latter in contact against the ramp surfaces 15 and 16 and against the associated diverging faces of the wedge structure 12.

It will be appreciated that a rotation of the control shaft 10 in one direction causes a displacement of the wedge 12 and of the associated rollers 14 in a direction which produces a relative separation of the ramp surfaces 15 and 16, and consequently a displacement of the piston structure 5 in the direction bringing the friction members 4 into frictional engagement with the discs 1, while a rotation of the control shaft 10 in the other direction will return the assembly consisting of the wedge structure 12 and of the rollers 14 towards the configuration of rest illustrated in the figure.

According to an advantageous aspect of the invention, as can be seen in FIG. 2, an assistance spring 50 of a force (for example, 40 daN) greater than that of the spring 21 is arranged between the partition 20 and the collar 22, holding the latter against the adjacent end of the wedge structure 12 and therefore normally biasing the latter in the direction of braking actuation. Thus, at the start of a braking phase, the power-assistance spring 50, compressed in the rest postion, supplies a substantial proportion of the braking force, the full power of the motor 8 only being required to obtain a maximum braking force (up to 60 daN). In contrast, in each debraking phase, when the motor no longer has to exert the braking force, the return of the wedge structure 12 towards its position of rest is exploited to recompress the assistance spring 50 which will thus be fully operational again for the subsequent braking phase.

According to a particular aspect of the invention, a force or pressure sensor 23, for example of the piezoelectric or strain-gauge type, is arranged between the stationary block 17 and its support in the calliper structure 2, in order, to detect, by reaction, the force exerted by the piston structure 5 on the friction members 4 and consequently the braking force exerted by the wedge structure 12, thus allowing accurate control of the motor 9 in both actuating directions. The electrical signals coming from the force sensor 23 are transmitted to an electronic control unit 24 which likewise receives signals coming from a position or force sensor 25 associated with the brake pedal 26 of the vehicle and providing the control signal, transmitted along a line 27, for the electric motor 8 to actuate the brake.

According to another feature of the invention, the piston means 5 includes a play compensation system designated as a whole by the reference numeral 28, such as that described, for example, in relation to FIG. 5 of the document No. EP-A-0,145,535, the content of which is assumed to be incorporated here for reference, and including a central screw 29 which directly actuates the adjacent friction member 4a and which is axially adjustable relative to the main structure of the piston means 5, which forms the rear ramp surface 15 and which is returned in the direction of engagement with the adjacent roller 14 by a pair of springs 30 and 31, which are coaxial relative to the axis of the bore 6, of the play compensation system 28.

Depending on the type of vehicle, a braking device according to the invention, with a single disc, typically makes uses of an electric motor 8 of a power of 115 watts at 5,500 revolutions per minute, with a pulse torque of 1 mN.

In embodiments with a pair of parallel discs 1a, 1b and an assistance spring 50, the electric motor 8 can have a considerably reduced power. The present invention can also be used in drum brakes, in which case the ramp surfaces 15 and 16 are formed by the opposing ends of two coaxial and opposite piston means, the force or pressure sensor 23 being integrated in one of these pistons.

We claim:

1. An electrical braking device for a vehicle, comprising an actuating mechanism for displacing at least one friction member in one direction and for bringing the friction member into frictional engagement with at least one rotary member to be braked, the actuating mechanism comprising an electric motor which drives in reversible rotation a control shaft having a threaded part cooperating in driving engagement with an actuating member displaceable linearly to actuate the friction member, characterized in that the control shaft extends substantially at a right angle to said direction, the control shaft connected to an output shaft of the electric motor via a flexible coupling, the actuating member comprising a wedge structure associated with at least one pair of rollers cooperating respectively with a pair of opposing ramp surfaces each of which are located opposite a respective side of the wedge structure, at least a first ramp surface of the ramp surfaces formed on piston means displaceable in said direction to actuate the friction member, the mechanism including axial thrust-bearing means between the control shaft and an adjacent stationary wall, and the mechanism further comprising an assistance spring biasing continuously the wedge structure in an actuating direction toward the piston means so as to assist in displacing the wedge structure during each brake application.

2. The electrical braking device according to claim 1, characterized in that the device comprises at least one force sensor device associated with at least one of said ramp surfaces.

3. The electrical braking device according to claim 1, characterized in that the rotary member comprises at least one disc, the device further including a caliper structure straddling the disc and supporting the actuating mechanism, said piston means sliding by being mounted in a bore formed in the caliper structure.

4. The electrical braking device according to claim 3, characterized in that a second ramp surface of said ramp surfaces is mounted stationary in the caliper structure.

5. The electrical braking device according to claim 4, characterized in that a force sensor device is associated with the second ramp surface.

6. The electrical braking device according to claim 5, characterized in that the rotary member comprises two parallel discs.

7. The electrical braking device according to claim 6, characterized in that the piston means includes a system that compensates for functional play.

8. An electrical braking device for a vehicle, comprising an actuating mechanism for displacing at least one friction member in one direction and for bringing the friction member into frictional engagement with at least one rotary member to be braked, the actuating mechanism comprising an electric motor which drives in reversible rotation a control shaft having a threaded part cooperating in driving engagement with an actuating member displaceable linearly to actuate the friction member, characterized in that the control shaft extends substantially at a right angle to said direction, the control shaft connected to an output shaft of the electric motor via a flexible coupling, the actuating member comprising a wedge structure associated with at least one pair of rollers cooperating respectively with a pair of opposing ramp surfaces each of which are located opposite a respective side of the wedge structure, at least a first ramp surface of the ramp surfaces formed on piston means displaceable in said direction to actuate the friction member, and the mechanism including axial thrust-bearing means between the control shaft and an adjacent stationary wall.

* * * * *